Nov. 14, 1972  E. GIESE ET AL  3,702,649
ONE-WAY CLUTCH HAVING TILTABLE SPRAGS
Filed Dec. 22, 1970  5 Sheets-Sheet 1

INVENTORS.
Emil Giese
BY Ruprecht Maurer
Karlheinz Timtner
Spencer & Kaye
ATTORNEYS.

FIG.11
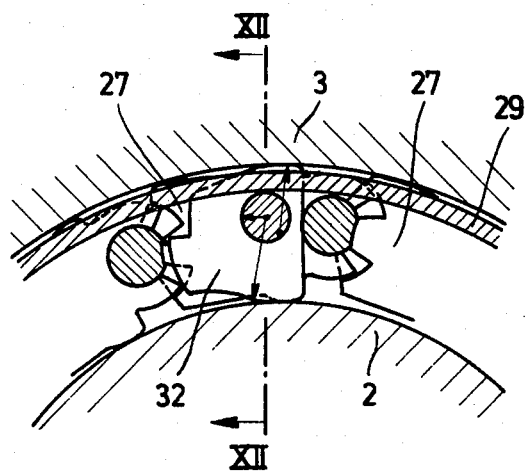
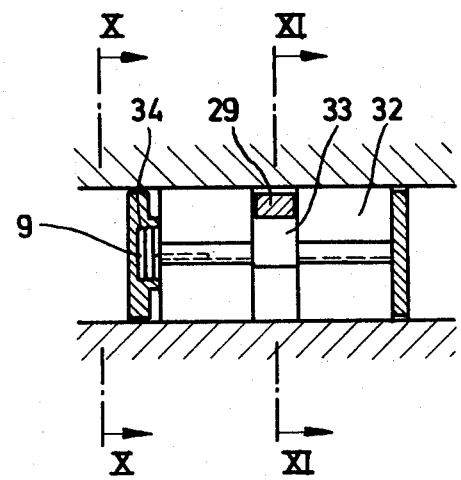
FIG.12

Nov. 14, 1972  E. GIESE ET AL  3,702,649
ONE-WAY CLUTCH HAVING TILTABLE SPRAGS
Filed Dec. 22, 1970  5 Sheets-Sheet 5

INVENTORS.
Emil Giese
Ruprecht Maurer
Karlheinz Timtner

BY Spencer & Kaye
ATTORNEYS.

United States Patent Office 3,702,649
Patented Nov. 14, 1972

3,702,649
ONE-WAY CLUTCH HAVING TILTABLE SPRAGS
Emil Giese, Ruprecht Maurer, and Karlheinz Timtner, Bad Homburg, vor der Hohe, Germany, assignors to Ringspann Albrecht Maurer K.G., Bad Homburg vor der Hohe, Germany
Filed Dec. 22, 1970, Ser. No. 100,725
Claims priority, application Germany, Jan. 31, 1970, P 20 04 457.9
Int. Cl. F16d 41/07, 43/24
U.S. Cl. 192—41 A
12 Claims

ABSTRACT OF THE DISCLOSURE

Between the two races of a one-way clutch are tiltable sprags mounted so as to be rotatable in synchronism with the inner race. The sprags are provided with edges or studs which serve as tilting bearings by means of which the sprags abut against the inner surface of at least one supporting ring. The ring rotates also synchronously with the inner race and the sprags are arranged on the ring in such a manner that the centrifugal force during rotation tilts the sprags so that the surface portion in contact with the outer race is lifted therefrom, thereby uncoupling the clutch.

CROSS-REFERENCE TO RELATED APPLICATION

The disclosure of application Ser. No. 815,802, filed on Apr. 14, 1969 by Emil Giese, a co-inventor of the present invention, now Patent No. 3,543,890 issued Dec. 1, 1970 and assigned to the same assignee as the present application, is incorporated herein by reference. Particular reference is made to the Description of the Preferred Embodiments of that application wherein a sprag cage assembled from individual links is described in great detail.

BACKGROUND OF THE INVENTION

The present invention relates to one-way clutches. More particularly the invention relates to clutches of the type which comprises tiltable sprags inserted between the concave-cylindrical bearing surface of an inner race and the concentrically arranged convex-cylindrical bearing surface of an outer race. The sprags are mounted in such a manner that the centrifugal force occurring during rotation of the clutch tilts the sprags to a position where the clutch is uncoupled.

One of the main problems inherent in one-way clutches of the above type is presented by the wear of the clutch in its uncoupled state. Even a comparatively small abrasion of material from the sprags will render the device inoperative. Since one-way clutches are often installed in long-lived devices and machines and since, on the other hand, a failure in operation may have dangerous consequences for the operating personnel it is particularly important to master these problems of wear. To this end clutches have already been developed with sprags which are tilted and lifted from the inner race by the centrifugal force which occurs when the clutch rotates with a certain number of r.p.m. Since in these clutches the sprags rotate synchronously with the outer race all wear is prevented beyond the number of r.p.m. which is necessary for lifting the sprags.

However, it is a disadvantage of these known clutch types that the outer race always has to rotate. The centrifugal force which tilts the sprags and thereby lifts one sprag end from the bearing surface of the inner race also pushes the sprags as a whole in an outward direction against the outer race. Only this outer race is therefore capable of driving the sprags and keeping them in rotation by means of a frictional connection.

In many modes of installation, for example, when a shaft is to be barred against back-run, a complicated design is required in order to connect the shaft, which is of course located in the center of the clutch, with the outer race while the inner race has to be connected to the stationary shaft housing, surrounding the shaft on the outside.

It is, therefore, an object of the present invention to provide a one-way clutch which can be installed in a simple manner in all those cases where, during freewheeling, the inner race of the clutch has to rotate freely while the outer race remains stationary and where in a coupled state the sprags are stationary relative to both the inner and the outer race or undergo only a slight displacement thereto.

SUMMARY OF THE INVENTION

The object set forth above is attained by bringing the sprag into a driving engagement with the inner race so that the sprags will rotate in synchromism with the inner race, and by providing means which cause the outer sprag ends to be lifted from the bearing surface of the outer race by the centrifugal force when the clutch rotates at a number of r.p.m. exceeding a certain critical number. To this end at least one additional ring member is mounted concentrically between the inner and the outer race and the sprags are provided with edges or studs which serve as tilting bearings. With the latter the sprags rest against the inside of the additional ring member which thus provides a support for the sprags against a displacement in a radial outward direction. The tilting bearings are arranged with their tilting axes in such a manner that the sprags are tilted to a position wherein the inner and the ouer races are uncoupled from one another.

Unlike the prior art clutches, the centrifugal force affecting the sprags is in the invented clutch absorbed by the additional support ring and not by the outer race. The tilting bearings of the sprags in combination with the unsymmetrical distribution of their mass enables them to tilt under the influence of the centrifugal force in such a manner that their outer clamping surface is lifted from the bearing surface of the outer race. The support ring is preferably, directly or indirectly, in a driving connection with the inner race so that the latter and the ring rotate synchronously.

Tests have proven it to be of advantage if in the sprags the tilting axis coincides with the axis of curvature of the clamping surface which engages the bearing surface of the inner race. Thereby a maximum lift of the outer clamping surface of the sprag from the bearing surface of the outer race is ensured, while the inner clamping surface remains in frictional contact with the bearing surface of the rotating inner race even during the tilting motion. This, on the other hand, guarantees a prompt re-coupling of the clutch out of its freewheeling state when so desired.

The tilting bearings may be formed by studs projecting from the sprags and having cylindrical or partially cylindrical roller surfaces, or by edges forming knife-edge bearings.

For supporting the sprags in the radial outward direction different means may be applied. For example, two discs may be secured to the inner race in the manner of flanges. The discs have a shoulder each, which provide the support rings for the sprags and which also provide a guide in axial direction of the clutch. The same object may be achieved by means of a cage or by only one support ring which surrounds the sprags and extends through recesses in the outer sprag portions.

For synchronizing the sprags with the inner race it has proven advantageous to establish a frictional driving connection between the discs and the inner race. Such connection may be brought about in an axial or radial direction by circular or polygonal spring rings. Further, it will be expedient if the inner clamping surfaces of the sprags are urged into contact with the bearing surface of the inner race by means of helical coil springs of which one arm engages the sprag while the other arm bears against one of the discs or against the bearing surface.

BRIEF DESCRIPTION OF THE DRAWINGS

The invention will be more readily comprehended from the following description when taken in conjunction with the appending drawings, wherein:

FIG. 11 is a cross-sectional view of a cage ring cut along line XI—XI in FIG. 12, FIG. 12 is a sectional view cut along line XII—XII in FIG. 11.

DESCRIPTION OF THE PREFERRED EMBODIMENTS

Figure 1:
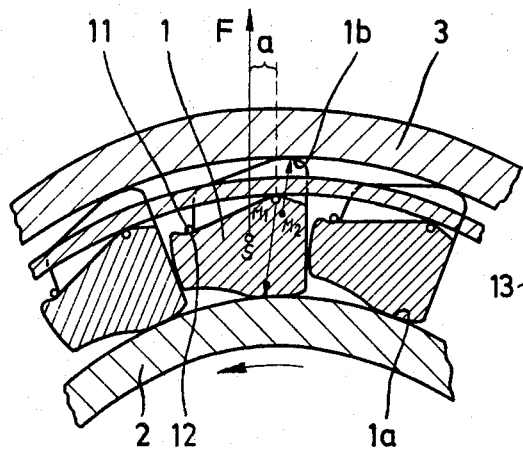
FIG. 1 is a cross-sectional view of a part of a one-way clutch cut in a direction normal to the clutch axis along line I—I in FIG. 2.
Figure 2:
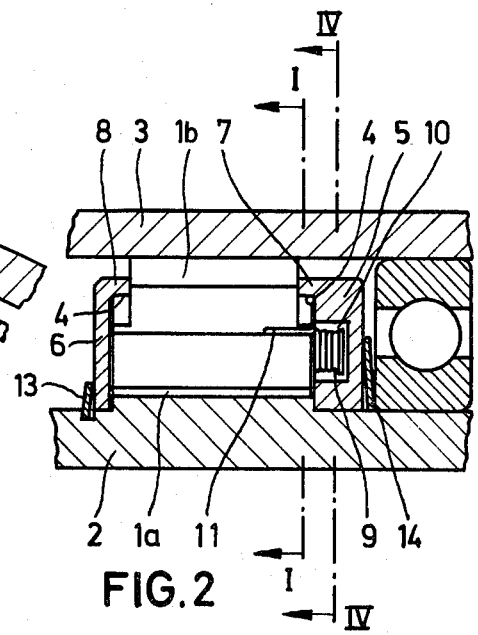
FIG. 2 is a sectional view of a part of a one-way clutch cut in parallel to the clutch axis between two sprags.
Figure 3:
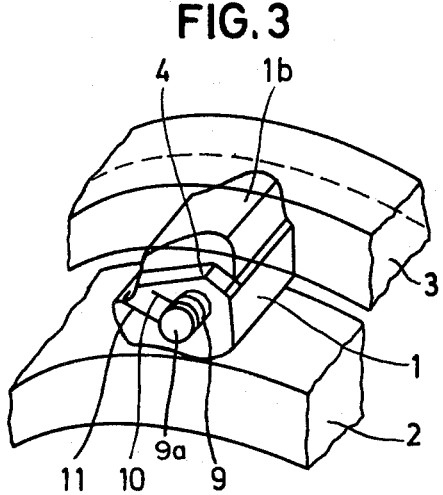
FIG. 3 is a perspective view of a sprag mounted between an inner and an outer race.
Figure 4:
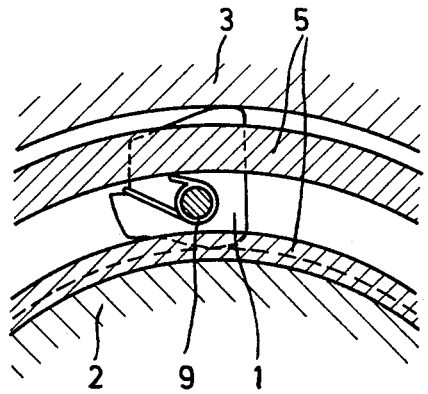
FIG. 4 is a cross-sectional view cut along line IV—IV in FIG. 2.

Referring now to the drawings, FIG. 1 shows sprags 1 arranged between an inner race 2 having a convex-cylindrical outer bearing surface and an outer race 3 having a concave-cylindrical inner bearing surface. From the FIGS. 1 and 3 it can probably best be seen that the sprags 1 are provided on both sides with edges 4 for tilting. The edges 4 abut against annular shoulders 7 and 8 which are part of the annular discs or ring means 5 and 6 resting on the inner race 2. Studs 9a project from one side of the sprags 1 and helical coil springs 9 are mounted thereon. One arm 10 of the springs 9 bears against the disc 5 while the other arm 11 engages the sprag 1 in a groove 12. The discs 5 and 6 are clamped to the inner race 2 by means of spring rings 13 and 14.

$M_1$ denotes the axis of curvature of the clamping surface $1a$ of the sprag 1 which bears against the inner race 2 and $M_2$ is the axis of curvature of the clamping surface $1b$ which bears against the outer race 3. Both axes extend perpendicularly to the plane of the drawing of FIG. 1. The center of gravity of each sprag is denoted S.

Now, let it be assumed that the inner race 2 rotates in the direction of the arrow in FIG. 1, i.e. in the freewheeling direction, while the outer race 3 remains stationary. The number of r.p.m. of the sprags 1 will then correspond to the number of r.p.m. of the inner race 2.

This synchronism in rotation is caused by the mechanical connection of the sprags 1 with the inner race 2 by means of the helical coil springs 9 and the discs 5 and 6. The driving effect which the inner race has on the sprags increases with an increasing number of r.p.m. since the centrifugal force F occurring in the center of gravity S urges the sprags into closer contact with the shoulders 7 and 8 of the annular discs 5 and 6. Relative to the tilting edge 4 the centrifugal force F causes a torque in clockwise direction having a lever arm $a$. This torque is inverse to the torque caused by the helical coil spring 9. Above a certain number of r.p.m. the torque caused by the centrifugal force will be sufficient to tilt the sprags about the tilting edge 4 in a clockwise direction. As a consequence the clamping surfaces $1b$ are lifted from the outer race 3 so that the clutch thereafter rotates without any friction and thus without wear.

Since in the embodiments shown in the FIGS. 1 through 4 and 13 and 14 the tilting edges 4 coincide with the axis of curvature of the clamping surfaces $1a$, the latter remain in constant engagement with the bearing surface of the inner race 2, regardless of the position to which the sprags may have been tilted to. This ensures a good synchronization between the inner race and the sprags as well as a quick and safe coupling action of the clutch.

Figure 5:
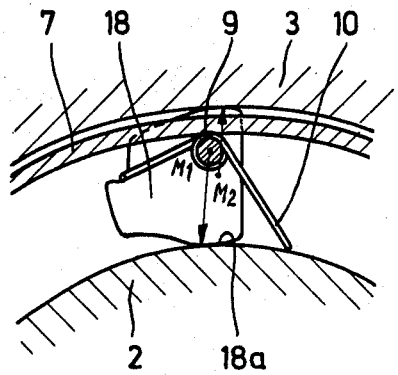
FIG. 5 is a cross-sectional view of a one-way clutch cut along a line V—V in FIG. 6 wherein a helical coil spring engages a sprag and the tilting bearings are cylindrical studs.
Figure 6:
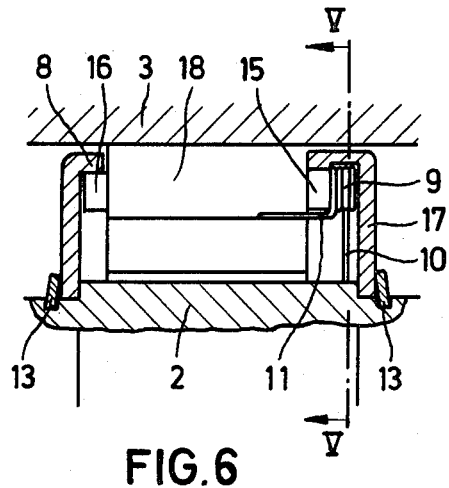
FIG. 6 is a sectional view cut in the direction of the clutch axis along line VI—VI in FIG. 5.

In the place of the tilting edges 4 provided on the sprags of the embodiments in the FIGS. 1 through 4, the sprags 18 in the embodiments illustrated in the FIGS. 5 and 6 have cylindrical studs 15 and 16 projecting from each side. The studs in these embodiments thus are the pivot about which the sprags tilt. The stud 15 is also used for mounting the helical coil spring 9 so that the manufacture and assembly of the sprags, races and springs of a clutch as shown in the FIGS. 5 and 6 is particularly simple. The embodiments illustrated in the FIGS. 5 and 6 differ from the embodiments shown in the FIGS. 1 through 4 also in that the arm 10 of the helical coil spring 9 does not bear against the adjacent annular disc 17 but against the inner race 2. However, also in this arrangement the helical coil spring 9 contributes to the synchronization of the sprags 18 with the inner race.

When using the cylindrical studs 15 and 16 as the pivot for the tilting motion it will be expedient if the axis of curvature of the inner clamping surface $18a$ coincides with the central axis of the studs. This, again, ensures a positive engagement of the clamping surface $18a$ with the inner race 2 in all positions of the sprag.

Figure 7:
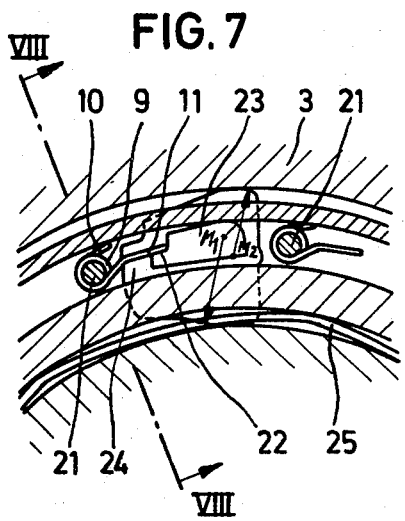
FIG. 7 is a cross sectional view of a one-way clutch cut along line VII—VII in FIG. 8 wherein the tilting bearings have partially cylindrical surfaces.
Figure 8:
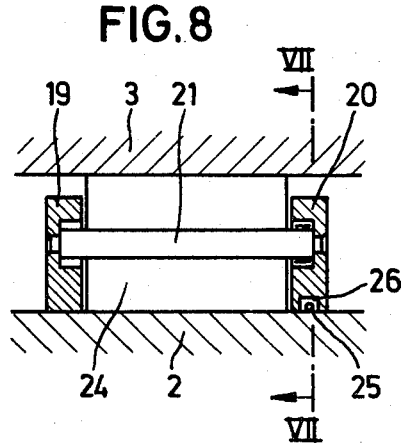
FIG. 8 is a cross-sectional view cut along line VIII—VIII in FIG. 7.

As shown in the FIGS. 7 and 8, the annular discs 19 and 20 may be connected by bolts 21 which may also be used for mounting the slightly differently shaped helical coil springs 9 thereon. The arm 10 of the spring rests against the annular disc 19 or 20 and the other arm 11 engages the sprag 24 in a recess 22 provided in a sprag portion 23 which projects from the right-hand side of the sprag (FIG. 8). The synchronization of the sprags with the inner race 2 is in this embodiment accomplished by means of the disc 20 and a polygonal wire ring 25 which is inserted between the inner race 2 and the disc 20 in a groove 26 provided in the disc. The ring brings about a strong frictional connection between the race and the disc so that, consequently, the sprags also rotate with a velocity about equal to that of the race. Prior to mounting the diameter of the circle circumscribed by the polygon is slightly smaller than the outer diameter of the inner race 2 so that, after mounting, the wire ring 25 establishes a clamping connection between the race and the disc.

Figure 9:
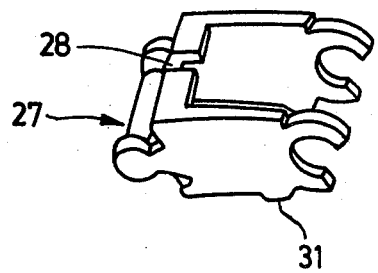
FIG. 9 is a perspective view of a cage link.
Figure 10:
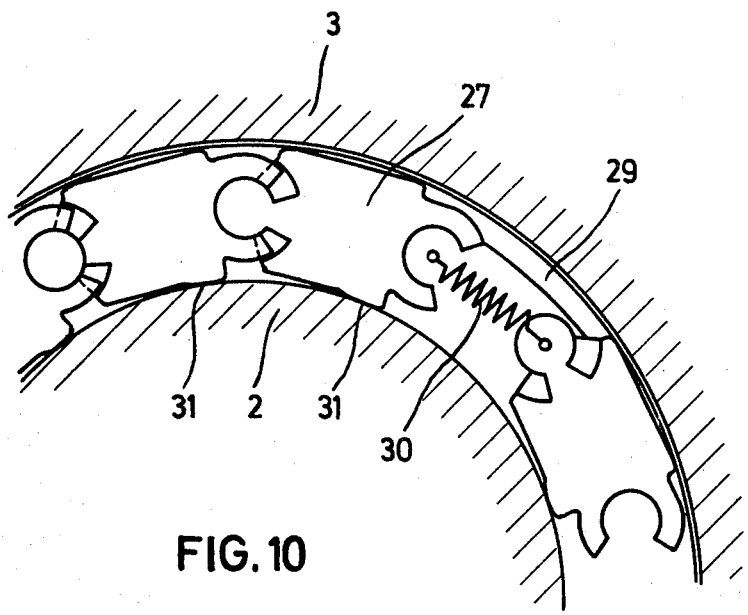
FIG. 10 shows a cage ring assembled from a plurality of cage links as shown in FIG. 9.

In the place of a ready to be installed cage with the sprags mounted therein, which cage is in the previous embodiments represented by the annular discs, it is of course also possible to assemble the cage from separate cage links as has already been disclosed in the U.S. patent application Ser. No. 815,802, filed Apr. 14, 1969 by Emil Giese, a co-inventor of the present invention. In the manner there described an open or closed cage may be assembled from similar links for shafts of different diameters. Such a cage link, slightly varied to fit the invented device, is illustrated in FIG. 9. The cage link 27 differs from the cage links as disclosed in the above mentioned application in that it is additionally provided with a notch 28. In the mounted state of the links and the clutch a ring 29 is inserted in the notches as a support ring against which the sprags are urged when tilted by the centrifugal force. A tension spring 30 is suspended between the first and the last link of the cage so that the projecting portions 31 of the links are held in contact with the inner race 2 in order to achieve good synchronization between the cage and the race (FIG. 10).

In the FIGS. 11 and 12 there is illustrated a one-way clutch which comprises a cage assembled from links 27. Sprags 32 are inserted in the cage. In a side view the sprags 32 are of about similar shape as the sprags 18 of the FIGS. 5 and 6. However they do not abut against the ring 29 by means of two cylindrical studs projecting sideways but by means of a central cylindrical portion 33. The helical coil spring 9 is arranged in a recess 34 in one side of the cage link 27 and urges the sprag 32 resiliently to turn into the coupling position.

Figure 13:
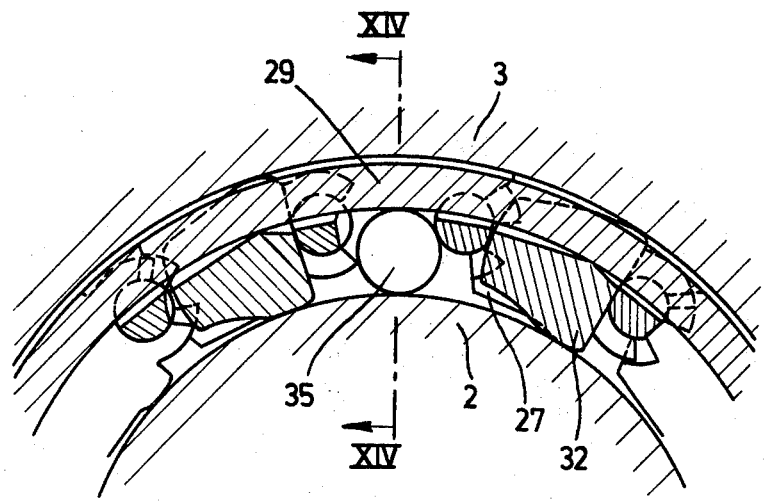
FIG. 13 shows a cross-sectional view of a one-way clutch comprising rollers for synchronizing the support ring.
Figure 14:
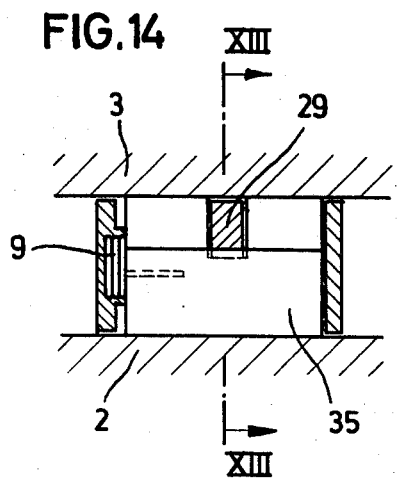
FIG. 14 is a sectional view cut along line XIV—XIV in FIG. 13.

A manner in which the support ring 29 may be centered relative to the inner race and the shaft by means of rollers 35 is shown in the FIGS. 13 and 14. The rollers are pressed into the annular space between the race and the ring and establish a positive connection between the two elements so that the ring 29 rotates with about the same angular velocity as the inner race 2.

The application of the present invention is not limited to the clutches comprising races having exactly circular bearing surfaces. Rather can the invention also be used in connection with clutches of which the bearing surface of the outer race differs slightly from the exact circular shape as, for example, disclosed in the U.S. Pat. 3,066,778; and it may also be used with clutches of which the sprags have non-circular clamping surfaces.

What is claimed is:

1. In a one-way clutch comprising in combination
   (a) an outer race having a concave-cylindrical inner bearing surface,
   (b) an inner race having a convex-cylindrical outer bearing surface, the outer race and the inner race defining an annular space between them,
   (c) a plurality of tiltable sprags arranged in the annular space next to one another, the sprags comprising an outer clamping surface for abutment with the outer race and an inner clamping surface for abutment with the inner race, and
   (d) tilting bearings provided on the sprags, the bearings being so located at a sprag portion relative to the center of gravity of the sprag that during clutch rotation the centrifugal force lifts the outer clamping surface from the outer race, the improvement comprising: ring means located between the inner race and the outer race and disposed radially outwardly of the tilting bearing, said ring means providing a support for at least one of the tilting bearings of the sprags, wherein said at least one tilting bearing bears against said ring means in a radially outwardly extending direction thereby establishing a frictional connection between the inner race and the sprags so that the sprags rotate with substantially the same angular velocity as the inner race.

2. A one-way clutch as claimed in claim 1, wherein the tilting bearings are at least partially cylindrical studs projecting from the sides of the sprags.

3. A one-way clutch as claimed in claim 1, wherein the tilting bearings are edges formed at the sides of the sprags, and wherein each bearing edge bears against said ring means in a radially outwardly extending direction.

4. A one-way clutch as claimed in claim 1, wherein said ring means supporting the sprags includes two discs which are inserted between the inner and the outer race and which hold the sprags between them, said discs each being provided with a shoulder, and wherein each tilting bearing of each sprag bears against a respective one of said shoulders in a radially outwardly extending direction.

5. A one-way clutch as claimed in claim 1, wherein the sprags are each provided with a recess, and wherein said ring means includes a single ring which surrounds the sprags and extends through said recess provided in each sprag to support the sprags in a radially outward direction.

6. A one-way clutch as claimed in claim 5, and further comprising a plurality of rollers inserted between said ring and the inner race, wherein said ring is centered around the inner race by said rollers, and wherein said ring is mounted on the inner race under a prestress.

7. A one-way clutch as claimed in claim 1, and further comprising a helical coil spring mounted on each of the sprags, wherein said ring means includes a pair of discs, and wherein one arm of each spring engages the sprag and the other arm abuts against one of said discs.

8. A one-way clutch as claimed in claim 1, and further comprising a helical coil spring mounted on each of the sprags, one arm of each spring engaging the sprag and the other arm abutting against the inner race.

9. A one-way clutch as claimed in claim 1, wherein said ring means includes a pair of discs, the one-way clutch further comprising spring rings for clamping said discs to the inner race and thus bringing about a frictional driving connection between the race and said discs.

10. A one-way clutch as claimed in claim 9, wherein said spring rings exert a resilient force in the axial direction of the clutch.

11. A one-way clutch as claimed in claim 9, wherein said spring rings exert a resilient force in the radial direction of the clutch.

12. A one-way clutch as claimed in claim 11, wherein said spring ring is of polygonal shape, circumscribing prior to mounting a circle of which the diameter is slightly shorter than the diameter of said inner race.

References Cited

UNITED STATES PATENTS

| | | | |
|---|---|---|---|
| 3,545,581 | 12/1970 | Kent | 192—45.1 |
| 2,389,961 | 11/1945 | Dodge | 192—45.1 |
| 3,022,875 | 2/1962 | Davis | 192—45.1 |

ALLAN D. HERRMANN, Primary Examiner

U.S. Cl. X.R.

192—45.1, 104 B